Feb. 18, 1941.   F. R. MAGILL   2,232,618
FLUID FILTERING OR STRAINING ELEMENT
Filed Dec. 22, 1938   2 Sheets-Sheet 2
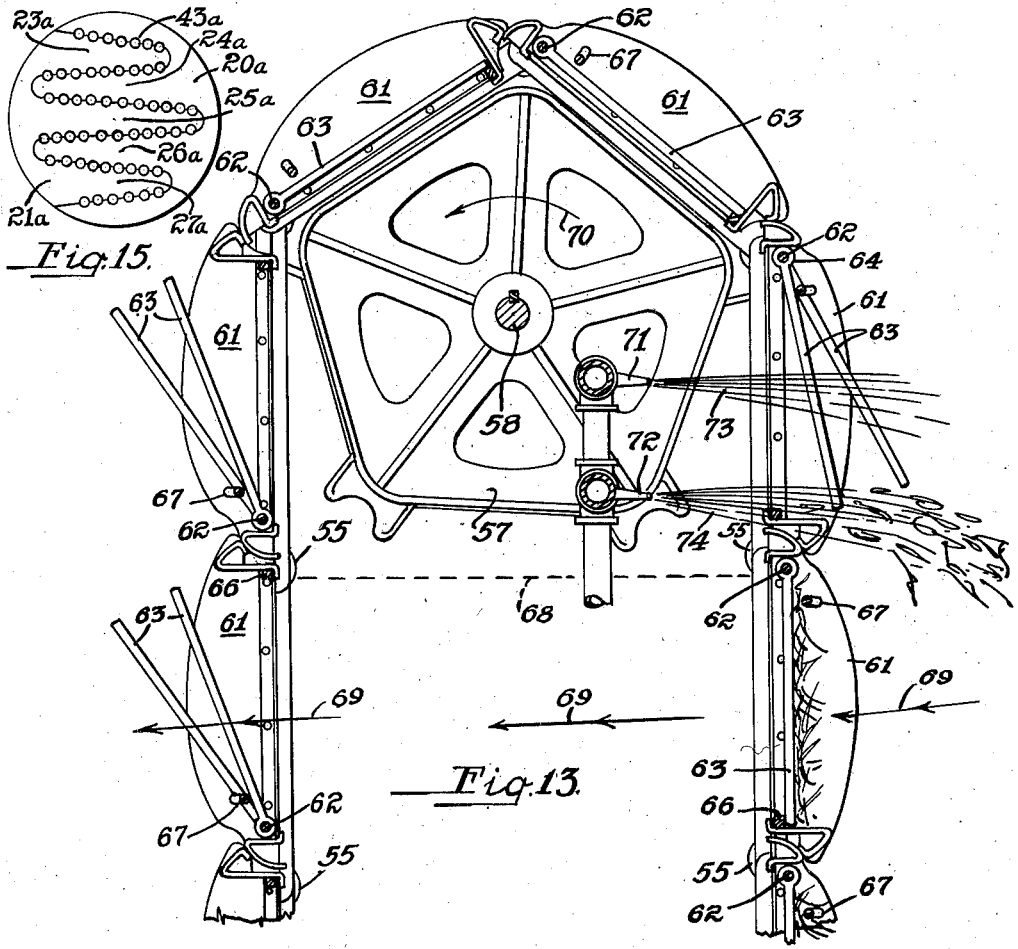
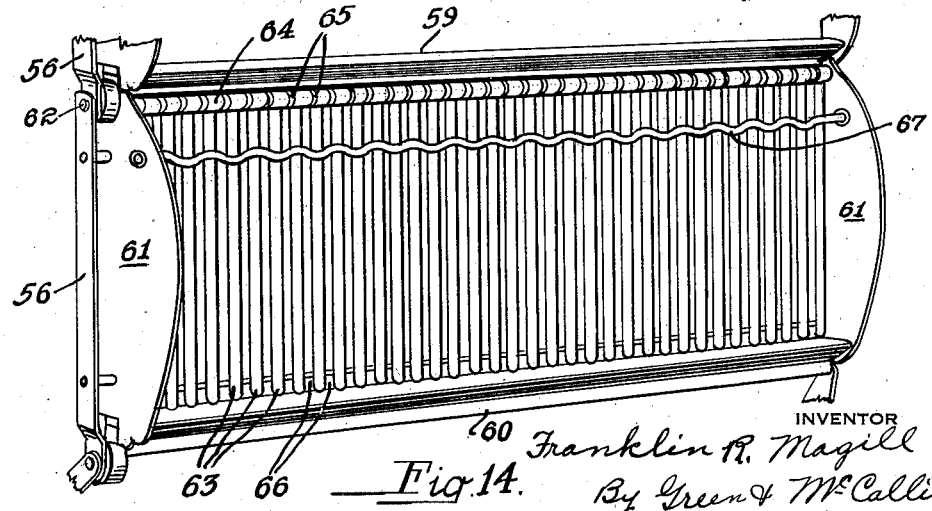
INVENTOR
Franklin R. Magill
By Green & McCallister
His Attorneys Patented Feb. 18, 1941

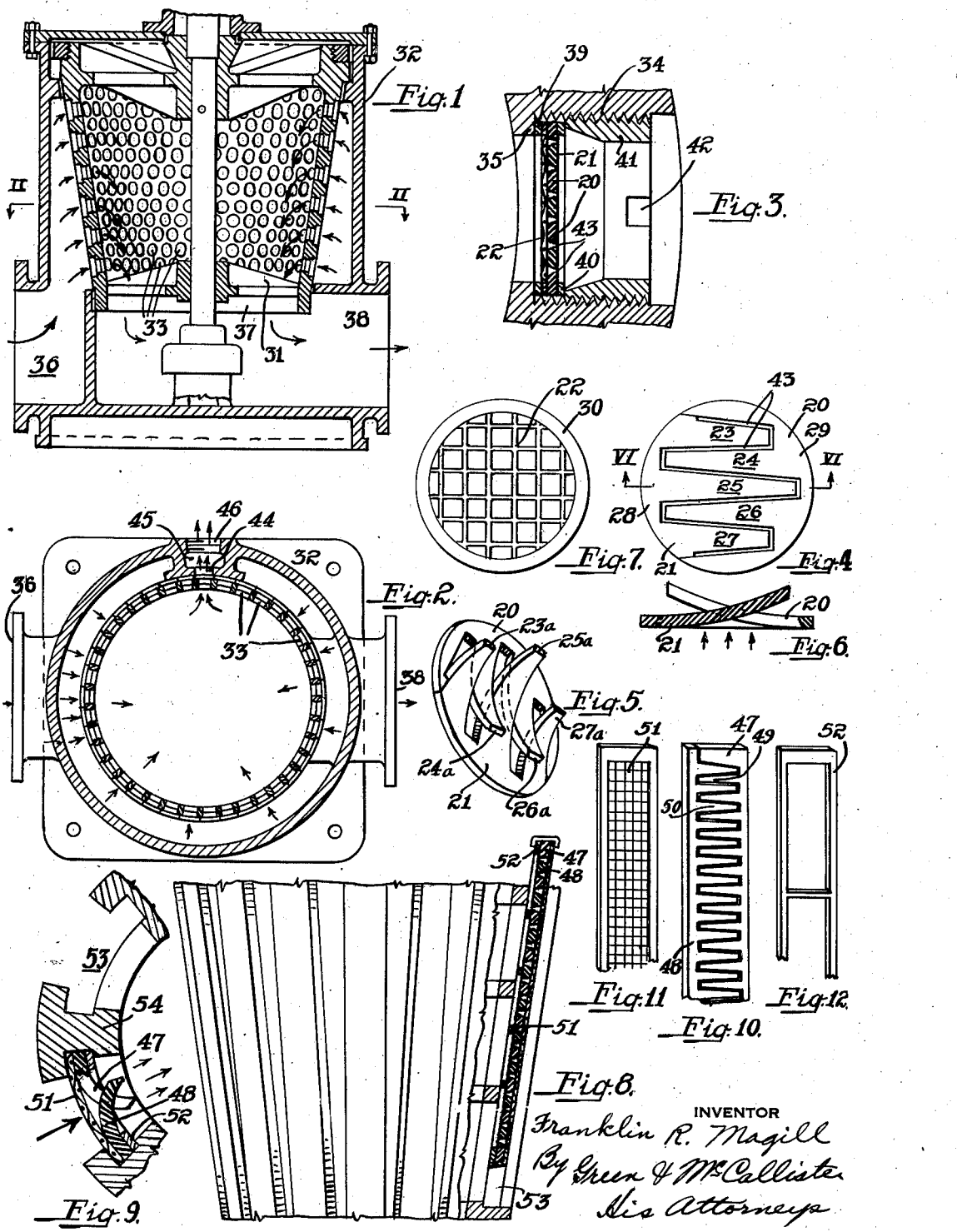

2,232,618

UNITED STATES PATENT OFFICE 2,232,618

FLUID FILTERING OR STRAINING ELEMENT

Franklin R. Magill, Mount Lebanon, Pa.

Application December 22, 1938, Serial No. 247,188

6 Claims. (Cl. 210—169)

This invention relates to devices for filtering therein, and more particularly to filtering or or straining from a liquid the solids contained straining elements for such devices as distinguished from the devices in which such elements are employed.

At the present time, there are on the market a number of types of filtering or straining devices and many of these are designed for removing from a liquid such as water, solid materials carried by the water.

One such device is known as the Brassert automatic strainer and in this device porcelain disks having round tapered holes extending therethrough are used as the straining or filtering elements or media. Another device is the Elliott Type K self-cleaning strainer and in this device the filtering or straining elements are made up of alternate layers of flat and corrugated copper strips fastened together to form a screen. The Andale rotary strainer is another device and in this the straining grids or filtering elements are made by winding two strips of stainless steel, one flat and the other corrugated, until they form a disk of the required diameter. Another device is the Rex traveling water screen.

In all of the devices to which reference has been made, a back wash or counter fluid flow of some sort is utilized for cleaning the filtering or straining elements, and one object of this invention is to produce improved filtering or straining elements or media for use in filtering or straining devices in which a back wash or counter fluid flow is utilized for cleaning the filtering elements or media.

A further object is to produce filtering or straining elements in which the openings therethrough are automatically increased in size during the back wash or cleaning period.

A still further object is to produce cheap and relatively simple filtering or straining elements of a new type which are capable of being embodied in a wide variety of filtering or straining devices.

These, as well as other objects, which will be apparent to those skilled in this particular art, I attain by means of the filtering or straining elements or media described in the specification and illustrated in the drawings accompanying and forming part of this application.

In the drawings:

Figure 1 is a more or less diagrammatic view in sectional elevation of an automatic strainer equipped with straining or filtering elements or media embodying this invention in one of its contemplated forms;

Fig. 2 is a view taken on line II—II of Fig. 1;

Fig. 3 is an enlarged detail view of one of the straining or filtering elements utilized in the device of Figs. 1 and 2 and shows the means of mounting and retaining said elements or media in place;

Fig. 4 is a front face view of one of such filtering or straining elements;

Fig. 5 is a perspective view of the element of Fig. 4 as it appears during the back wash or cleaning period;

Fig. 6 is a sectional view taken on line VI—VI of Fig. 4 but shows the element as it appears during the back wash period;

Fig. 7 is a face view of a backing member or screen such as may be utilized in connection with the element of Figs. 3-6 inclusive;

Fig. 8 is a fragmentary sectional view (more or less schematic) of the rotating element of a filter or strainer of another type;

Fig. 9 is an enlarged fragmentary view and illustrates two of the channels for receiving the filtering elements; a filtering element being shown in one of these channels as it appears during the back wash period;

Fig. 10 is a perspective view of a filtering element for use in the device of Figure 8;

Fig. 11 is a perspective view of a backing screen for the element of Fig. 10;

Fig. 12 is a perspective view of a retaining member for the element of Fig. 10;

Fig. 13 is a more or less schematic view in sectional elevation of the upper portion of a traveling screen equipped with filtering or straining elements embodying another form of this invention;

Fig. 14 is a perspective view of one such other form of filtering or straining element; and Fig. 15 is a view similar to Fig. 4 and illustrates a modified form of filtering or straining element.

In the drawings, I have disclosed a number of different forms which the filtering element of this invention may take. This invention is capable of being embodied in various forms other than those disclosed.

Broadly, the filtering or straining element of this invention comprises one or more series of elongated imperforate members arranged side by side and spaced apart so as to provide fluid passages therebetween. These members may be formed from readily bendable or flexible material such as rubber, flexible plastics included among which is the material known as "Exton," or corrosion resistant sheet metal. One end of each member of such series is free to flex while its opposite end is anchored or otherwise held in position. In some cases, however, alternate members only have a free end. The members of each series are arranged in line and preferably in a common plane. Each complete filtering or straining element also includes a backing member located on what might be termed its downstream side, and which is arranged to hold the free ends of the members in line during the filtering period. The free ends of the members are free to flex or move away from the backing members, and it is the capacity for this latter movement which gives to these elements their self-cleaning characteristic. During the filtering or straining procedure, these spaced members are in line (straight or curved as the case may be); the spacing being that which is necessary to obtain the filtering or straining desired.

When the element is back washed, that is, when liquid or other fluid is directed against the same in a direction opposite to the direction of normal liquid flow, the free ends of the members move out of line and away from their backing members. In other words, the filtering element opens up, thus permitting the foreign matter which has been caught thereby to be displaced and washed away.

A filtering or straining element for use in filtering or straining apparatus of Figures 1 and 2 is disclosed in Figures 3 to 7 inclusive and as shown in these figures comprises a circular disklike member made up of two parts 20 and 21 and a backing member or screen 22. Parts 20 and 21 may be formed from rubber-like sheet material, and cut or molded as to provide aligned and spaced apart impervious members, such as members 23, 24, 25, 26 and 27. The root or inner end of these members 23, 25 and 27 merges with the body portion 28 of member 21 and the root or inner end of members 24 and 26 merges with the body portion 29 of member 20.

The root ends of these members therefore, are fixed or anchored while the opposite ends of these members are free to move or flex away from the backing member as later described.

Backing member or screen 22 comprises a coarse screen as shown in Fig. 7 preferably formed from one of the non-corrosive metals or alloys and an outer ring 30 formed from the same metal and within which the screen 22 is secured.

In Figures 1 and 2 which more or less diagrammatically illustrate an automatic strainer equipped with straining or filtering elements or media of this invention, the rotor element 31 which is mounted for rotation within a housing 32 is provided with many circular openings 33. These openings extend through the wall or body of the rotor and as shown in Fig. 3 each opening is threaded as at 34 and is provided with an inwardly extending annular shoulder 35.

The liquid or other fluid to be strained enters the outer casing 32 through an inlet 36, passes through the filtering elements located within openings 33 of the rotor and leaves the interior of the rotor through its open bottom 37 and then passes out of the device through outlet 38.

In assembling the filtering or straining elements or media within openings 33, annular flexible packing rings 39 are first positioned against annular shoulders 35, backing members or screens 22 are then placed in position in contact with said packing rings and the filtering disks made up of members 20 and 21 are then placed against said screens or backing members. Next, metal retaining rings 40 are positioned against the outer face of the filtering or straining disks and threaded annular locking members or nuts 41 are screwed in place against retaining rings 40. Each locking member 41 is provided with oppositely positioned notches 42 for reception of a suitable assembly tool whereby said members may be inserted and removed, as will be understood. It will be apparent that when two members 20 and 21 are locked in place, they in effect become one circular disk having a series of imperforate members arranged side by side in spaced relation. The spaces 43 between these members provide the liquid passages through the filtering or straining elements or media.

These spaces or passages, as shown in Fig. 3, are narrower on the liquid inlet side than they are on the liquid outlet side.

Fig. 4 is an outer face view of a disk made up of parts 20 and 21. Figs. 5 and 6 illustrate the action of spaced members 23 to 27 inclusive during a back wash period. During this period when the back wash liquid flows from the inside of rotor 32 to a point of lower pressure as indicated by the arrows in Fig. 6, the free ends 23a, 24a, 25a, 26a and 27a flex or move outwardly away from backing screen 22 and into the interior of circular member or nut 41 whereby the filtering elements or media are automatically cleaned by the back wash liquid.

In Fig. 2, 44 represents one of a series of vertically aligned circular openings 33. The outer ends of these openings connect with a vertically extending chamber 45 which by means of an outlet 46 and suitable piping (not shown) is adapted to be connected to a sewer or other place of discharge (not shown) for the back wash liquid. The sewer or other place of discharge will of course be of lower pressure than the interior of rotor 31.

Figure 8 illustrates a fragment, in section, of another type of rotor for a filtering or straining device and in this device, the water to be strained or filtered first enters the rotor and then flows out through the filtering or straining elements or media with which the rotor is equipped. Such a device includes in its make-up a back wash receiving chamber similar to chamber 45 but located on the inside of the rotor. This chamber is connected to a sewer or other place of discharge, of lower pressure than the pressure of the filtered liquid.

In this form of device, each filtering or straining element is made up of two relatively long comb-like strips 47 and 48 molded or otherwise formed from flexible rubber-like material, or flexible metal. The teeth 49 of strip or part 47 interleave with teeth 50 of strip or part 48 and the teeth are of such dimensions as to provide (when the strips or parts are assembled as shown in Fig. 10) a series of spaced apart impervious members; the spaces between which form the liquid passages.

The filtering elements, each of which comprises a filtering or straining element proper made up of parts 48 and 49, a backing member or screen 51 and a retainer 52, are located within slots 53 formed for their reception in rotor element 54. In Fig. 8 an assembled element made up of parts such as parts 47 and 48, backing screen 51 and retainer 52, is shown as being slid downwardly into one of said slots 53.

In Fig. 9, the upper slot 53 is shown empty while the lower slot is shown equipped with one of my straining or filtering elements. The arrows in this figure indicate the direction of the flow of liquid during the back wash period.

In Figure 13, a number of filtering or straining elements embodying this invention in another form is disclosed as part of the make-up of a traveling screen type straining or filtering device and in Figure 14 one such element and the contiguous parts of such device are disclosed.

The filtering device comprises a number of rectangular frames which are hingedly connected together. The device is provided with two strands of suitable roller chains which carry said frame; the rollers of such chains being numbered 55 and the side links thereof 56. These chains pass over and mesh with a pair of spaced upper sprocket wheels 57 mounted on a shaft 58 which is preferably motor driven at the desired speed. The lower sprockets of the device are not shown.

Each frame comprises a top member 59, a bottom member 60 and side members 61. A circular bearing rod 62 located adjacent top member 59 spans the space between side members 61. Each support and bearing rod 62 carries a series of depending rods or bars 63. Each of these rods or bars 63 is provided at one end (normally its upper end) with a tubular portion 64 which surrounds support and bearing rod 62 so that said rods are free to swing. Annular spacers 65 are placed between adjacent tubular portions 64 so as to space rods or bars 63 the proper distance apart to form liquid passages therebetween of the desired width. If desired, these spacers may be omitted and tubular portions 64 can be made of sufficient length to space bars or rods 63 the proper distance apart. Bars 63 are so mounted as to swing freely about bearing rods 62 and in order to prevent pivotal movement of the same in one direction (the direction of liquid flow) stop members 66 in the form of bars extend between side members 61—61 of the frames adjacent the bottoms of said bars.

In order to limit movement of said pivoted bars 63 away from their stop member 66, a movement limiting bar 67 extends between and is connected to side members 61—61 for each frame. These movement limiting bars 67 as shown in the drawings, are located beyond the plane of the series of bars 63 and each is waved or corrugated so that alternate rods or bars 63 are permitted greater movement from stop members 66 than the bars therebetween.

In Figure 13, six complete filtering or straining elements of the type shown in detail in Fig. 14 are shown. In this figure, line 68 denotes approximately the top surface of the stream of liquid which flows in the direction of arrow 69 through the filtering or straining device.

Sprockets 57 rotate counterclockwise or in the direction of arrow 70 so that the straining or filtering elements on the right-hand side of Fig. 13 move up through the liquid stream to be filtered while those on the left-hand side of said figure move down through the filtered liquid.

Two series of high pressure liquid spray jets 71 and 72 are shown. Jets 71 are located above jets 72 and each series of jets extends across the device from one side to the other. The liquid discharged by said spray jets automatically removes from the filtering elements the refuse carried by the same above the liquid level 68. This refuse may fall back into the liquid on the inlet side of the device but it is preferably carried by the spray jets to some suitable trough or conveying means out of the path of the liquid stream.

Pivoted bars 63 are free to swing outwardly under the action of the back wash jets 71 and 72, except for movement limiting bars 67. This member permits alternate bars 63 to swing further than the others and in this way the spaces between the bars are increased during the back wash periods.

The modified form of filtering or straining element illustrated in Fig. 15 may be formed from flexible rubber-like material or from flexible non-corrosive metal. The imperforate members 23a, 24a, 25a, 26a and 27a, instead of being spaced apart as in the other forms, lie in close contact with one another and semi-circular openings or notches are formed in their abutting edges. As shown, the notches in one member register with those in the other member, whereby circular openings 43 are provided. These openings of course can be of almost any shape, but I prefer circular openings.

During the filtering or straining periods, the only openings through the filtering or straining disks or elements are openings 43, but during the back wash periods, members 23a, 24a, 25a, 26a and 27a flex or open up as shown in Fig. 5. This flexing and opening up permits the back wash liquid to thoroughly flush and cleanse the several parts making up the filtering disk or element.

Having thus described my invention, what I claim as new and desire to secure by Letters Patent is:

1. In a liquid filtering device, a series of imperforate members so spaced as to provide liquid passages therebetween; one end of each such member being secured to a support with the opposite end thereof free to move, means serving as a backing for said members and being arranged to hold the same in normal position with the spaces therebetween fixed during flow therebetween of liquid being filtered; the free ends of said members being free to move away from said support when subjected to a counter flow of fluid.

2. In a device of the character described, a filtering element support arranged in the path of the liquid to be filtered, a filtering element carried by said support and comprising a series of imperforate members arranged in spaced relation to provide openings therebetween for the passage of filtered liquid, means for holding said members against movement in the direction of the normal liquid flow; one end of certain of said members at least being movable away from said means in a direction counter to the normal liquid flow and means for causing fluid flow in a direction counter to the normal liquid flow for back washing said filtering element.

3. A filtering element comprising a series of imperforate flexible members arranged side by side in abutting relation with notches in the abutting edges, one end of certain of said members at least being free to flex in one direction and means for preventing flexure of said members from normal position in the opposite direction.

4. In a filtering device, a filter element comprising a series of aligned imperforate members arranged in spaced relation to provide filtering openings therebetween, means for holding said members against movement during normal liquid flow; said members being movable away from said means to increase the openings therebetween during counterflow of fluid and means for causing fluid flow in a direction counter to normal liquid flow for back washing said filter element.

5. In a liquid filtering device, a series of aligned imperforate members so spaced as to provide filtering passages therebetween; said members being movable toward and from filtering position, stop means resisting movement of said members during flow therebetween of filtered liquid; said members being free to move away from said stop means for increasing the spaces therebetween when subjected to a counterflow of back wash fluid.

6. In a filtering device, a series of spaced imperforate members mounted for movement toward and from filtering position, means for holding said members in filtering position in opposition to the force exerted thereagainst by the flow of liquid to be filtered, means for subjecting said series of members to a counterflow of back wash fluid so directed thereagainst as to move the same to increase the spaces therebetween and means for limiting the movement of said members away from filtering position when subjected to the counterflow of back wash fluid.

FRANKLIN R. MAGILL.